United States Patent
Farkas

(10) Patent No.: US 6,718,762 B2
(45) Date of Patent: Apr. 13, 2004

(54) CONTINGENCY HYDRAULIC POWER UNIT

(75) Inventor: Tibor Farkas, Orange, CA (US)

(73) Assignee: The Boeing Company, Chicago, IL (US)

(*) Notice: Subject to any disclaimer, the term of this patent is extended or adjusted under 35 U.S.C. 154(b) by 104 days.

(21) Appl. No.: 10/093,151

(22) Filed: Mar. 7, 2002

(65) Prior Publication Data

US 2003/0167763 A1 Sep. 11, 2003

(51) Int. Cl.⁷ .............................................. F15B 31/02
(52) U.S. Cl. ........................................... 60/404; 244/78
(58) Field of Search ......................... 60/404, 405, 413; 244/158 R, 104 FP, 78, 226, 58

(56) References Cited

U.S. PATENT DOCUMENTS

| | | | | | |
|---|---|---|---|---|---|
| 3,426,650 A | * | 2/1969 | Jenney | ..................... | 91/216 R |
| 3,591,964 A | * | 7/1971 | Salemka | ..................... | 60/413 |
| 4,533,097 A | * | 8/1985 | Aldrich | ..................... | 244/78 |
| 4,754,940 A | * | 7/1988 | Deter | ..................... | 244/78 |
| 5,100,082 A | * | 3/1992 | Archung | ..................... | 60/403 |

* cited by examiner

*Primary Examiner*—Edward K. Look
*Assistant Examiner*—Igor Kershteyn
(74) *Attorney, Agent, or Firm*—John R. Rafter

(57) ABSTRACT

An hydraulic power assembly 10 is provided, including at least one primary hydraulic power unit 20 supplying hydraulic fluid 30 to a hydraulic system 34, and a contingency hydraulic power unit 50 utilizing the orbiter's helium storage tank 52 to power a contingency hydraulic drive 56 to supply hydraulic fluid 30 from a contingency hydraulic fluid reserve 58 to the hydraulic system 34 during peak loading conditions.

23 Claims, 1 Drawing Sheet

CONTINGENCY HYDRAULIC POWER UNIT

TECHNICAL FIELD

The present invention relates generally to a contingency hydraulic power unit and more particularly to a contingency hydraulic power unit for use in an aircraft/spacecraft.

BACKGROUND OF THE INVENTION

Hydraulic systems are commonly utilized to provide power required for operating components within aircraft, spacecraft, and the shuttle orbiter. Hydraulic systems have been utilized to power a variety of components including, but not limited to, wing flaps, control surfaces, thrust reversers, steering systems, braking systems, and landing gear. Many of such systems are crucial to the proper operation of the craft. Safety considerations, therefore, often dictate that redundant or contingent hydraulic systems be present to insure proper operation. These redundant hydraulic systems are designed to provide adequate power should the primary hydraulic unit become damaged or malfunction. It is known that these redundant/contingent systems often take the form of duplicate hydraulic units. In some circumstances, such as those involving control surfaces, there may be as many as three or more separate hydraulic systems to provide a greater margin of safety. Although such duplicate systems provide the necessary redundancy, they can often result in negative design considerations involving space and weight requirements. The space required to house these redundant systems as well as the weight associated with their presence can prove undesirable in spacecraft design.

Present shuttle orbiter designs are often sensitive to these space/weight design considerations. The orbiter hydraulic systems have often utilized hydrazine auxiliary power units (APUs) to provide both primary and redundant hydraulic power. It is known, however, that hydrazine is both toxic and flammable and may therefore require its own design safety considerations when used within the orbiter design. Orbiter designs have therefore also utilized electric APUs (EAPUs) to improve such safety considerations. Although the use of EAPUs eliminates some of the safety considerations associated with hydrazine units, present orbiter systems often require three or more electro-hydraulic drive units (EHDU). These drive units must commonly be sized to achieve a single APU landing capability. This results in large, heavy and complex EAPU's. The use of these new EAPU units, however, can pose a threat to the size/weight characteristics of a successful orbiter design that can be compounded when multiple units are utilized.

Although each EHDU often requires only two modules for normal operation, it is known that a third module may be required to provide high flow capability. High flow capability may be required in a variety of circumstances such as during main wheel touchdown during aircraft landing. During main wheel touchdown, it is common for the hydraulic system to require a peak load demand and an increased flow capability. Although the requirement for high flow may only occur for ten to twenty seconds after weight on wheels, the ability of the EHDU to provide adequate flow during these periods can be critical to the proper operation of the aircraft. Thus a contingency hydraulic unit capable of insuring adequate high flow capabilities during critical times, while reducing the negative weight characteristics associated with redundant modules would be highly desirable.

SUMMARY OF THE INVENTION

It is, therefore, an object of the present invention to provide a contingency hydraulic power unit. It is a further object of the present invention to provide a hydraulic power assembly for use in an aircraft with contingent power capabilities.

In accordance with those and other objects of the present invention, a hydraulic power assembly is provided. The hydraulic power assembly includes at least one primary hydraulic power unit providing hydraulic fluid through hydraulic lines to a hydraulic system. The hydraulic power assembly further includes a contingent hydraulic power unit. The contingent hydraulic power unit includes a hydraulic fluid reserve. A gas turbine, powered by a helium storage unit, is capable of supplying the hydraulic fluid reserve to the at least one primary hydraulic unit during high flow requirements.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
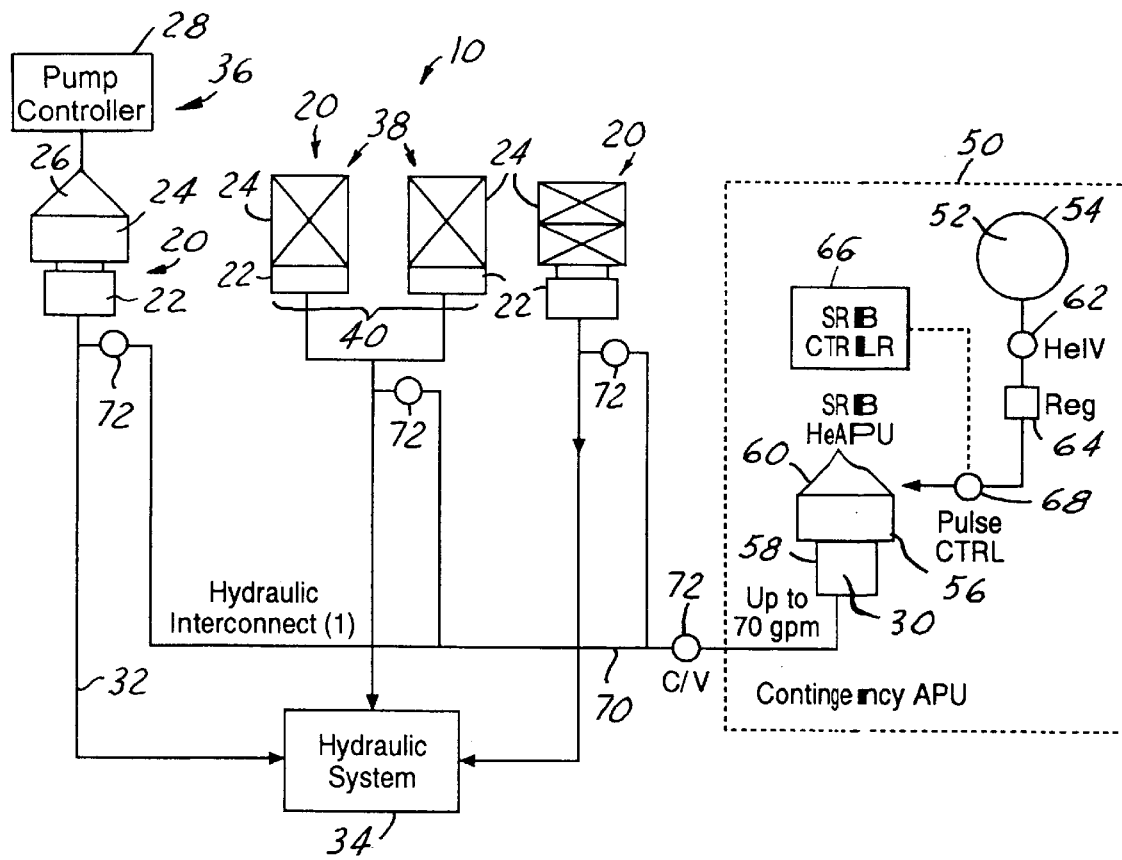
FIG. 1 is an illustration of an embodiment of a hydraulic power assembly in accordance with the present invention.
Figure 2:
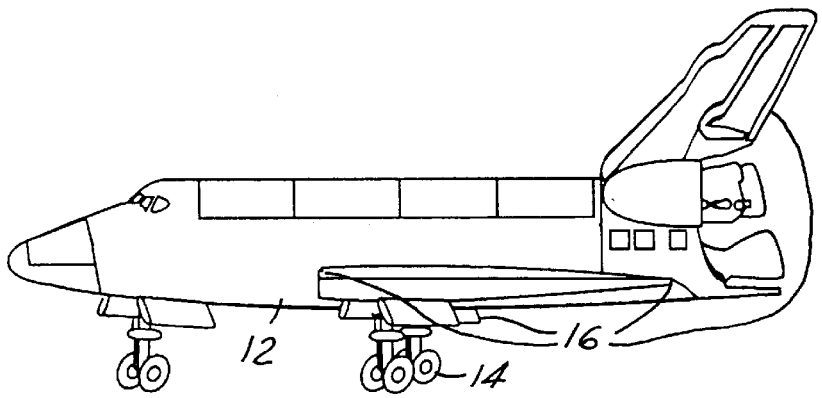
FIG. 2 is an illustration of an embodiment of an aircraft for use with a hydraulic power assembly in accordance with the present invention.

Referring now to FIG. 1, which is an illustration of a hydraulic power assembly 10 in accordance with the present invention. The hydraulic power assembly 10 is intended for use within an aircraft/spacecraft 12 (see FIG. 2) such as a shuttle orbiter. It should be understood, however, that the hydraulic power assembly 10 can be utilized within a wide variety of applications including those unrelated to aircraft/spacecraft 12. Although the present invention can be used in both aircraft and spacecraft, throughout this application, the term spacecraft 12 will be utilized to refer to both such applications. It is also well known in the art, and contemplated by the present invention that the hydraulic power assembly 10 can be used to power a wide variety of individual systems within the aircraft 12. These individual systems can include, but are not limited to, systems such as landing gear 14 and flight control elements 16. It is contemplated, however, that hydraulic power may be utilized to power a wide variety of varying systems within aircraft/spacecraft 12.

The hydraulic power assembly 10 includes at least one primary hydraulic power unit 20. The at least one primary hydraulic power unit 20 includes a primary hydraulic fluid reserve 22 and a primary hydraulic drive 24. The primary hydraulic drive 24 commonly consists of a pump 26 and a pump controller 28. The primary hydraulic drive 24 supplies hydraulic fluid 30 through hydraulic lines 32 to a hydraulic system 34. As discussed, the hydraulic system 34 can be utilized to power a wide variety of applications such as landing gear 12, flight control elements 16, and a host of other applications. The design and application of primary hydraulic power units 20 are well known in the prior art. It is known that the primary hydraulic pump drives 24 may also take on a variety of designs. One embodiment contemplates the use of hydrazine drives 36. Another embodiment contemplates the use of electro-hydraulic drives 38. It should be noted that the aforementioned drives, as well as a host of other drive units may be used alone or in combination to power the hydraulic system 34.

Although not required to practice the present invention, several primary hydraulic power units 20 may be used in concert to power the hydraulic system 34. It is common for multiple primary hydraulic power units 20 to be utilized to provide redundancy in the hydraulic system 34. The redundancy provided by multiple units can be utilized to allow functionality of the hydraulic system 34 after failure of one or more primary hydraulic power units 20. In one embodiment, illustrated in FIG. 1, three primary hydraulic power units 20 are utilized to power the hydraulic system 34. It should be understood that the number of hydraulic power units 20 as well as the flow rate figures that are to be discussed are for illustrative purposes only and are not meant as limitations on the present invention. One hydrazine drive 36 unit and two electro-hydraulic drive 38 units are illustrated. The electro-hydraulic drives 38 are illustrated to indicate a dual drive unit 40 and a single drive unit 42. These drives are shown to illustrate to flexibility of primary hydraulic power units 20 capable of use with the present invention and are not intended as a limitation.

The three drives 36, 40, and 42, illustrated in FIG. 1 are commonly designed to be capable of producing a peak flow of hydraulic fluid 30 to the hydraulic system 34 during high flow requirement scenarios. One such scenario occurs during the landing of the aircraft 12 after touchdown of the landing gear 14. For the sake of illustration, we shall say the hydraulic system 34 requires a flow of 90 gpm of hydraulic fluid 30 during such high flow requirement scenarios. Prior shuttle orbiter designs often required each of the primary hydraulic power units 20 to be capable of supporting the peak flow requirements in case of failure of the other two units. That meant that each primary hydraulic power unit 20 had to be capable of producing 90 gpm. This has lead to an increase in the size and weigh of the primary hydraulic power units 20 and the corresponding negative impact on the shuttle orbiter 20.

The present invention relieves the requirement that each of the primary hydraulic power units 20 need be designed to handle the peak flow requirement on their own. The present invention accomplishes this through the use of a contingency hydraulic power unit 50. The contingency hydraulic power unit 50 utilizes helium 52 stored in the helium storage tank 54 already present on many shuttle orbiter designs to power a contingency hydraulic power drive 56. The helium storage tank 54 is often the main propulsion gas storage tank 54 in a spacecraft 12. By utilizing the main propulsion gas storage tank 54 as a power source for the contingency hydraulic power unit 50, no additional weighted power source need be added to the spacecraft 12 design. The contingency hydraulic power drive 56 can feed hydraulic fluid 30 contained in a contingency hydraulic fluid reserve 58 into the hydraulic system 34 to bolster the flow during peak flow requirements. Although a variety of contingent hydraulic power drives 56 are contemplated by the present invention, one embodiment contemplates the use of a gas turbine 60 as the contingent hydraulic power drive 56. The contingency hydraulic power unit 50 can also include a variety of additional components. In one embodiment a helium valve 62 and regulator 64 can be utilized to regulate the flow of helium gas 52 from the helium storage tank 54. A controller in 66 in communication with a control valve 68, such as a pulse control valve, controls the flow of helium 52 to the contingent hydraulic power drive 56 and thereby provides control of the output of the contingency hydraulic power unit 50. Although specific elements have been described to regulate and control the helium 52 and the contingency hydraulic power unit 50, it should be understood that a wide variety of control systems would be obvious to one skilled in the art.

The contingency hydraulic power unit 50, as stated, can be utilized to provide a supplemental flow of hydraulic fluid 30 to the hydraulic system 34 to increase or supplement the flow from the primary hydraulic power unit 20 or units. This can allow for the reduction in size and output of the individual primary hydraulic power unit/units 20 as they will no longer be required to supply peak hydraulic power individually. It should be noted that the contingency hydraulic power unit 50 can interact with the primary hydraulic power units 20 in a variety of fashions. It is contemplated that the contingency hydraulic power unit 50 can provide flow of hydraulic fluid 32 to be summed with the output of a surviving primary hydraulic power unit 20 when its companion units have failed. It is also contemplated that the contingency hydraulic power unit 50 can provide flow of hydraulic fluid 32 to revive, or replace, the flow from a primary hydraulic power unit 20 that has failed. In order to either replace or supplement the primary systems, the contingency hydraulic power unit 50 must be in communication with the hydraulic system 34. Although this can be accomplished through a variety of known or obvious scenarios, one embodiment utilizes a hydraulic interconnect line 70 to place the contingency hydraulic power unit 50 in communication with the hydraulic system 34. A control valve 72 may be used in conjunction with the hydraulic interconnect line 70 in order to route flow from the contingency hydraulic power unit 50.

Although the contingency hydraulic power unit 50 may be placed in communication with the hydraulic system 34 in a variety of configurations, two embodiments are illustrated in FIG. 1. Again, the precise number of primary hydraulic power units 20 and the flow rates discussed are for illustrative purposes and are not intended as structural limitations. The contingency hydraulic power unit 50 may be connected to a single primary hydraulic power unit 20 or to all three, for example, primary hydraulic power units 20. A plurality of hydraulic interconnect lines 70 and control valves 72 may be utilized to route flow from the contingency hydraulic power unit 50 when the contingency unit 50 is connected to all three primary units 20.

It is contemplated that the hydraulic power assembly 10 can be configured in several fashions to account for the failure of multiple primary power units 20 (in this example 2 units) while still being capable of providing sufficient flow. In one contemplated configuration, the contingency hydraulic power unit 50 is connected to all three primary units 20 and is selected to support the surviving primary power unit 20 to achieve 90 gpm capability. In another configuration, the contingency hydraulic power unit 50 is connected to all three primary hydraulic power units 50 and is selected to "recover" one of the failed primary units 50 such that the orbiter 12 lands with two power units rather than one. In this case, the contingency hydraulic power unit 50 need only supply the 70 gpm flow previously supplied by the failed primary power unit 20. In still another embodiment, the contingency hydraulic power unit 50 is connected to only one of the primary power units 20. In this case, if the contingency hydraulic power unit 50 is connected to the surviving primary power unit 20, it can boost its output to the 90 gpm. If the contingency hydraulic power unit 50 is connected to one of the failed primary power units 20, it can recover the failed unit to work in conjunction with the surviving unit. Again, although specific numbers of primary power units 20 and flow rates have been provided, it should be understood that these numbers and values are for illustrative purposes only.

While particular embodiments of the invention have been shown and described, numerous variations and alternative embodiments will occur to those skilled in the art. Accordingly, it is intended that the invention be limited only in terms of the appended claims.

What is claimed is:

1. A spacecraft hydraulic power assembly, comprising:
    at least one primary hydraulic power unit supplying hydraulic fluid to a hydraulic system; and
    at least one contingency power unit in communication with said hydraulic system, said at least one contingency power unit capable of providing additional flow of hydraulic fluid to said hydraulic system, said at least one contingency power unit comprising:
        a helium storage tank;
        a gas turbine in communication with said helium storage tank; and
        a contingency hydraulic fluid reserve in communication with said hydraulic system;
    wherein said gas turbine, powered by said helium storage tank, supplies hydraulic fluid stored in said contingency hydraulic fluid reserve to said hydraulic system.

2. A spacecraft hydraulic power assembly as described in claim 1, further comprising:
    at least one hydraulic interconnect line connecting said contingency power unit to said at least one primary hydraulic power unit.

3. A spacecraft hydraulic power assembly as described in claim 1, wherein said contingency power unit further comprises:
    a helium valve; and
    a regulator, said helium valve and regulator controlling the flow of helium out of said helium storage tank.

4. A spacecraft hydraulic power assembly as described in claim 1, wherein said contingency power unit further comprises:
    a controller; and
    a pulse control valve, said controller and pulse control valve regulating delivery of helium from said helium storage tank to said gas turbine.

5. A spacecraft hydraulic power assembly as described in claim 1, wherein said at least one primary hydraulic power unit comprises:
    a first primary hydraulic power unit;
    a second primary hydraulic power unit; and
    a third primary hydraulic power unit.

6. A spacecraft hydraulic power assembly as described in claim 1, wherein said contingency power unit is in communication with only one of said at least one primary hydraulic power units.

7. A spacecraft hydraulic power assembly as described in claim 1, wherein said at least one primary hydraulic power unit comprises:
    a hydraulic fluid reserve; and a
    a primary hydraulic drive.

8. A spacecraft hydraulic power assembly as described in claim 1, wherein said hydraulic system comprises landing gear.

9. A spacecraft hydraulic power assembly comprising:
    at least one primary hydraulic power unit supplying hydraulic fluid to a hydraulic system;
    at least one contingency power unit in communication with said hydraulic system, said at least one contingency power unit powered by at least one helium storage tank and capable of providing additional flow of hydraulic fluid to said hydraulic system; and
    at least one control valve controlling communication between said contingency power unit and said at least one primary hydraulic power unit.

10. A spacecraft hydraulic power assembly comprising:
    at least one primary hydraulic power unit supplying hydraulic fluid to a hydraulic system;
    at least one contingency power unit in communication with said hydraulic system, said at least one contingency power unit powered by at least one helium storage tank and capable of providing additional flow of hydraulic fluid to said hydraulic system, said contingency power unit in communication with each of said at least one primary hydraulic power units.

11. A spacecraft hydraulic power assembly comprising:
    a first primary hydraulic power unit, including a first hydraulic fluid reserve and a first primary hydraulic drive, said first primary hydraulic power unit supplying hydraulic fluid from said first hydraulic fluid reserve to a hydraulic system;
    a second primary hydraulic power unit, including a second hydraulic fluid reserve and a second primary hydraulic drive, said second primary hydraulic power unit supplying hydraulic fluid from said second hydraulic fluid reserve to said hydraulic system; and
    a contingency power unit in communication with said hydraulic system, said at least one contingency power unit including a helium storage tank, a contingency hydraulic power drive, and a contingency hydraulic fluid reserve, said helium storage tank powering said contingency hydraulic power drive to supply hydraulic fluid from said contingency hydraulic fluid reserve to said hydraulic system upon failure of one of said primary hydraulic power units, said contingency hydraulic power drive comprising a gas turbine.

12. A spacecraft hydraulic power assembly as described in claim 11, further comprising:
    at least one hydraulic interconnect line connecting said contingency power unit to said first primary hydraulic power unit.

13. A spacecraft hydraulic power assembly as described in claim 11, further comprising:
    at least one hydraulic interconnect line connecting said contingency power unit to said first primary hydraulic power unit; and
    at least one hydraulic interconnect line connecting said contingency power unit to said second primary hydraulic power unit.

14. A spacecraft hydraulic power assembly as described in claim 11, wherein in response to failure of said first primary hydraulic power unit, said contingency power unit boosts flow from said second primary hydraulic power unit during increased flow requirements.

15. A spacecraft hydraulic power assembly as described in claim 11, wherein in response to failure of said first primary hydraulic power unit, said contingency power unit replaces flow from said first primary hydraulic power unit during increased flow requirements.

16. A spacecraft hydraulic power assembly as described in claim 11, wherein said contingency power unit further comprises:

a helium valve; and a regulator, said helium valve and regulator controlling the flow of helium out of said helium storage tank.

17. A spacecraft hydraulic power assembly as described in claim 11, wherein said first primary hydraulic power unit is an electro-hydraulic power unit.

18. A spacecraft hydraulic power assembly comprising:
- a first primary hydraulic power unit, including a first hydraulic fluid reserve and a first primary hydraulic drive, said first primary hydraulic power unit supplying hydraulic fluid from said first hydraulic fluid reserve to a hydraulic system;
- a second primary hydraulic power unit, including a second hydraulic fluid reserve and a second primary hydraulic drive, said second primary hydraulic power unit supplying hydraulic fluid from said second hydraulic fluid reserve to said hydraulic system; and
- a contingency power unit in communication with said hydraulic system, said at least one contingency power unit including a helium storage tank, a contingency hydraulic power drive, and a contingency hydraulic fluid reserve, said helium storage tank powering said contingency hydraulic power drive to supply hydraulic fluid from said contingency hydraulic fluid reserve to said hydraulic system upon failure of one of said primary hydraulic power units; said contingency power unit comprising:
  - a controller; and
  - a pulse control valve, said controller and pulse control valve regulating delivery of helium from said helium storage tank to said gas turbine.

19. A spacecraft hydraulic power assembly comprising:
- at least one primary hydraulic power unit supplying hydraulic fluid to a hydraulic system;
- at least one contingency power unit in communication with said hydraulic system, said at least one contingency power unit powered by at least one main propulsion gas storage tank and capable of providing additional flow of hydraulic fluid to said hydraulic system.

20. A spacecraft hydraulic power assembly as described in claim 19, wherein said main propulsion gas storage tank comprises a helium storage tank.

21. A spacecraft hydraulic power assembly as described in claim 19, wherein said at least one contingency power unit comprises:
- a helium storage tank;
- a gas turbine in communication with said helium storage tank; and
- a contingency hydraulic fluid reserve in communication with said hydraulic system;
- wherein said gas turbine, powered by said helium storage tank, supplies hydraulic fluid stored in said contingency hydraulic fluid reserve to said hydraulic system.

22. A spacecraft hydraulic power assembly as described in claim 19, wherein said contingency power unit further comprises:
- a controller; and
- a pulse control valve, said controller and pulse control valve regulating delivery of helium from said helium storage tank to said gas turbine.

23. A spacecraft hydraulic power assembly as described in claim 19, wherein said at least one primary hydraulic power unit comprises:
- a first primary hydraulic power unit;
- a second primary hydraulic power unit; and
- a third primary hydraulic power unit.

* * * * *